US005866877A

United States Patent [19]

Maetani et al.

[11] Patent Number: 5,866,877

[45] Date of Patent: Feb. 2, 1999

[54] OVEN FOR HEATING ELONGATE CORD

[75] Inventors: Masakastu Maetani; Shinji Kotani; Haruyuki Tsubaki; Takashi Masuda, all of Hyogo, Japan

[73] Assignee: Mitsuboshi Belting Ltd., Kobe, Hyogo, Japan

[21] Appl. No.: 810,086

[22] Filed: Mar. 3, 1997

[51] Int. Cl.[6] .............................. A21B 1/00; F26B 13/00

[52] U.S. Cl. ................................................ 219/400; 318/7

[58] Field of Search .................................... 219/400, 388, 219/528, 548, 524; 34/266, 270, 451, 459; 474/237, 265; 126/274; 99/467; 318/7

[56] References Cited

U.S. PATENT DOCUMENTS

| | | | |
|---|---|---|---|
| 4,075,299 | 2/1978 | Bloxham | 264/25 |
| 5,113,058 | 5/1992 | Srubas | 219/528 |
| 5,433,368 | 7/1995 | Spigarelli | 219/390 |
| 5,440,101 | 8/1995 | Cox | 219/388 |

*Primary Examiner*—Teresa J. Walberg
*Assistant Examiner*—Daniel Robinson
*Attorney, Agent, or Firm*—Wood, Phillips, VanSanten, Clark & Mortimer

[57] ABSTRACT

An oven for continuously heating a cord, which oven has a housing defining an internal space for treatment of a cord. The housing has an inlet and an outlet communicating with the internal housing space and between which a cord being heated passes in a predetermined path. A heating chamber is defined within the internal housing space through which a cord being heated travels between the housing inlet and outlet. A first partition within the internal housing space is located beneath at least a part of the predetermined path and defines an upper wall of a hot air supply chamber within the internal housing space. The first partition has an elongate slit therethrough that resides beneath, and extends parallel to, the part of the predetermined path through which slit air in the hot air supply chamber is communicated to the heating chamber. An inlet opening in the housing communicates heated air to the hot air supply chamber. The housing has a second partition with first and second openings spaced in a lengthwise direction relative to the slit for causing heated air in the heating chamber to branch into each of the first and second openings. An air moving element is provided. There is further provided a conduit system for directing air from the first and second openings to the air moving element and for directing air accelerated by the air moving element to the hot air supply chamber. There is additionally a heater for air directed into the heating chamber.

23 Claims, 7 Drawing Sheets

OVEN FOR HEATING ELONGATE CORD

BACKGROUND OF THE INVENTION

1. Field of the Invention

This invention relates to apparatus for treating an elongate cord, such as the type incorporated into power transmission belts and, more particularly, to an oven for heating the cord so as to effect curing of a processing substance applied thereto.

2. Background Art

It is known to use load carrying cords in all types of power transmission belts, i.e. V-belts, V-ribbed belts, toothed belts, etc., and particularly those used in industrial applications. Typically, the cords are made from fiber material, such as polyester fiber, aramid fiber, glass fiber, and the like. To improve adhesion with the belt rubber, it is known to pre-treat the fiber cords. For example, it is known to treat the cords with resorcinol-formalin-latex (RFL) alone or to use the RFL treatment after pre-treating the cords with an epoxy or isocyanate compound. It is also known to adhere rubber gum after the RFL treatment.

Apparatus are known for continuously pulling a cord from a supply under a fixed tension, using a drive roller, and to guide the cord in a predetermined path for processing. In this predetermined path, the cord moves through an adhesive processing liquid in a first dip tank, after which the cord is directed into an oven in which it is exposed to heated air. The cord continues to move to outside of the oven to complete a first treatment step. Additional dip tanks and ovens may be used to sequentially apply different processing liquids, followed by heating, which takes place once or any desired number of times following processing liquid application during the process. In addition to using different processing liquids, different heating temperatures can be used in the ovens. Additionally, the cords may be drawn to different tensions to produce optimal properties for the cord as a belt component. Upon completion of the treatment of the cord, the cord can be continuously collected on a take-up reel.

An exemplary prior art oven for use in the above type of system is disclosed in Japanese Unexamined Patent Publication No. H.4-146232. Through intake and discharge fans, hot air is supplied to and discharged from a heating chamber. The heated air is circulated within the heating chambers. This unit is characterized as a "vertical" type unit.

It is also known to circulate the air in a partially closed system outside of the heating chamber. Through separate fans, some air is controllably drawn into a circulating air stream in a conduit communicating between intake and discharge openings on the oven and exhausted therefrom. As the heated air is circulated, the concentration of combustible gases produced within the heating chamber from vaporization of processing solvent such as toluene, or the like, is diminished.

In conventional apparatus for treating a cord, to effect high efficiency heat treatment, it has been generally necessary to advance the cord in a predetermined path at a relatively high speed. With this arrangement, the cord with the processing liquid thereon may be advanced through the heating chamber in the oven and out against a guide roller without the processing liquid being fully hardened. As a result, some of the processing liquid may adhere to and accumulate on the surface of the guide structure, which may be a roller, or the like. This condition may ultimately be aggravated to the point that the operation of the system is impaired.

To promote drying, it is also known to raise the temperature in the oven. However, cords generally have optimum treating temperatures. Thus, it is not practical to increase the temperature in the ovens without adversely affecting the properties of some cords.

As an alternative to raising the temperature in the oven, it is known to increase the size of the oven so that the cord travels for more extended periods therewithin. This results in the overall size of the apparatus increasing, which may add to the equipment cost and increase operating costs by reason of more extensive heat loss. Additionally, more installation and operating space is required. Further, it may be more difficult to perform regular inspections of, and maintenance on, the apparatus and to re-thread the cord as when the type of cord to be processed is changed. In a worst case, safety may be compromised by this construction.

SUMMARY OF THE INVENTION

It is an object of the present invention to provide an apparatus for heating a cord that may be constructed to overcome one or more of the problems in the prior art, identified above. The invention allows a relatively small apparatus to be made which efficiently heats a cord.

In one form of the apparatus, an oven is provided for continuously heating a cord, which oven has a housing defining an internal space for treatment of a cord. The housing has an inlet and an outlet communicating with the internal housing space and between which a cord being heated passes in a predetermined path. A heating chamber is defmed within the internal housing space through which a cord being heated travels between the housing inlet and outlet. A first partition within the internal housing space is located beneath at least a part of the predetermined path and defines an upper wall of a hot air supply chamber within the internal housing space. The first partition has an elongate slit therethrough that resides beneath, and extends parallel to, the part of the predetermined path, through which slit air in the hot air supply chamber is communicated to the heating chamber. An inlet opening in the housing communicates heated air to the hot air supply chamber. The housing has a second partition with first and second openings spaced in a lengthwise direction relative to the slit for causing heated air in the heating chamber to branch into each of the first and second openings. An air moving element is provided. There is further provided a conduit system for directing air from the first and second openings to the air moving element and for directing air accelerated by the air moving element to the hot air supply chamber. There is additionally a heater for air directed into the heating chamber.

An auxiliary opening may be provided in the second partition between the first and second openings.

In one form, the cord moves in the part of the predetermined path substantially parallel to and directly over the elongate slit.

In one form, the housing has spaced ends, with heated air being introduced to the hot air supply chamber at a first location. The hot air supply chamber has a cross-sectional area, with the cross-sectional area of the hot air supply chamber diminishing between the first location and each of the spaced housing ends.

In one form, a second partition is spaced above the heating chamber and bounds a hot air recovery chamber. The hot air recovery chamber has a cross-sectional area. An air discharge opening in the housing communicates with the hot air recovery chamber at a second location and the cross-sectional area of the hot air recovery chamber diminishes between the second location and each of the spaced housing ends.

The housing ends may be spaced in a lengthwise direction with respect to the elongate slit in the first partition.

In one form, the first partition has a first thickness in a vertical direction and there are first and second plates with first and second surfaces that bound the elongate slit and extend in a vertical direction a distance greater than the thickness of the first partition.

A plurality of discrete elongate slits may be provided in the first partition through which air is communicated from the hot air supply chamber to the heating chamber. These slits may each have a width of 3–10 mm with a spacing of 5–30 mm between slits.

The air moving element may be a fan that causes air to be directed through the elongate slit at 5–30 meters per second.

The oven may be provided in combination with a guide structure and a cord for use in a power transmission belt moving through the guide structure in the predetermined path through the heating chamber.

The invention also contemplates the oven in combination with a treatment unit for applying a processing liquid to the cord moving in the predetermined path before the cord moves through the heating chamber.

A first conduit may be included for directing atmospheric air to the air moving element. A second conduit can be provided for exhausting air from the air moving element to the atmosphere.

A damper can be provided to control the exhaustion of air to the atmosphere through the second conduit.

The invention further contemplates an oven for continuously treating a cord, which oven has a housing defining a hot air supply chamber, a heating chamber, an air intake opening communicating with the hot air supply chamber, and a discharge opening communicating with the heating chamber. A partition is provided between the hot air supply chamber and the heating chamber. A guide system directs a cord in a predetermined path through the heating chamber. A slit is provided through the partition, with the slit located directly beneath a part of the predetermined path for communicating heated air from the hot air supply chamber to the heating chamber to against a cord moving in the predetermined path. A hot air circulating system directs air from the discharge opening back into the hot air supply chamber through the air intake opening. A heater heats air moving in the hot air circulating system before the air moves through the slit to against a cord moving in the predetermined path.

In one form, the part of the predetermined path and the elongate slit are both substantially straight.

The slit may extend over substantially the entire extent of the partition between the ends of the housing.

The predetermined path may include multiple path parts in which a cord passes back and forth through the heating chamber and a first path part in which a cord travels upon initially entering the heating chamber. In one form, the slit is directly beneath the first path part.

DETAILED DESCRIPTION OF THE DRAWINGS

Figure 1:
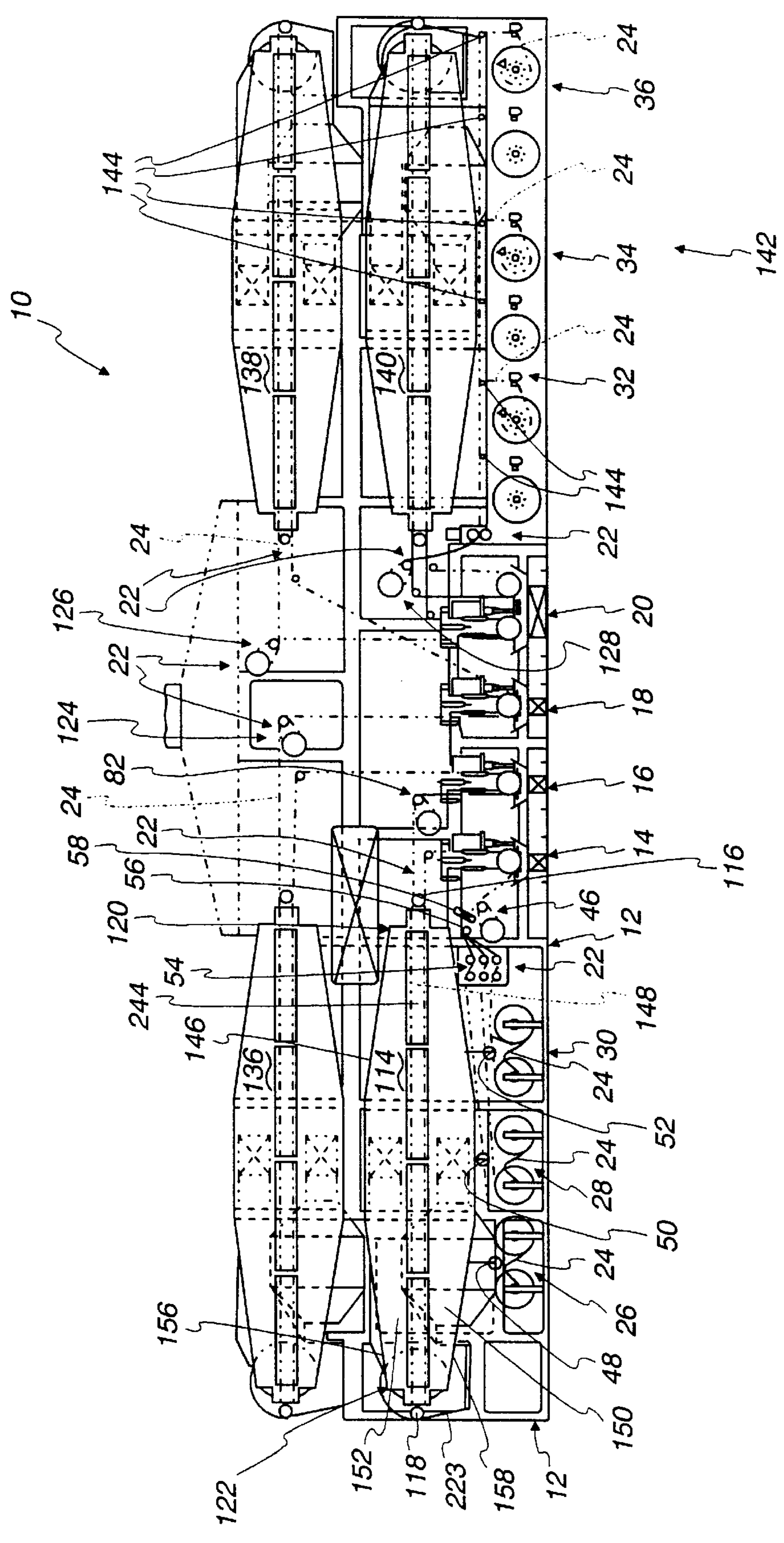
FIG. 1 is a front elevation, partial cross-sectional view of an apparatus for treating cords for use in power transmission belts, according to the present invention.
Figure 2:
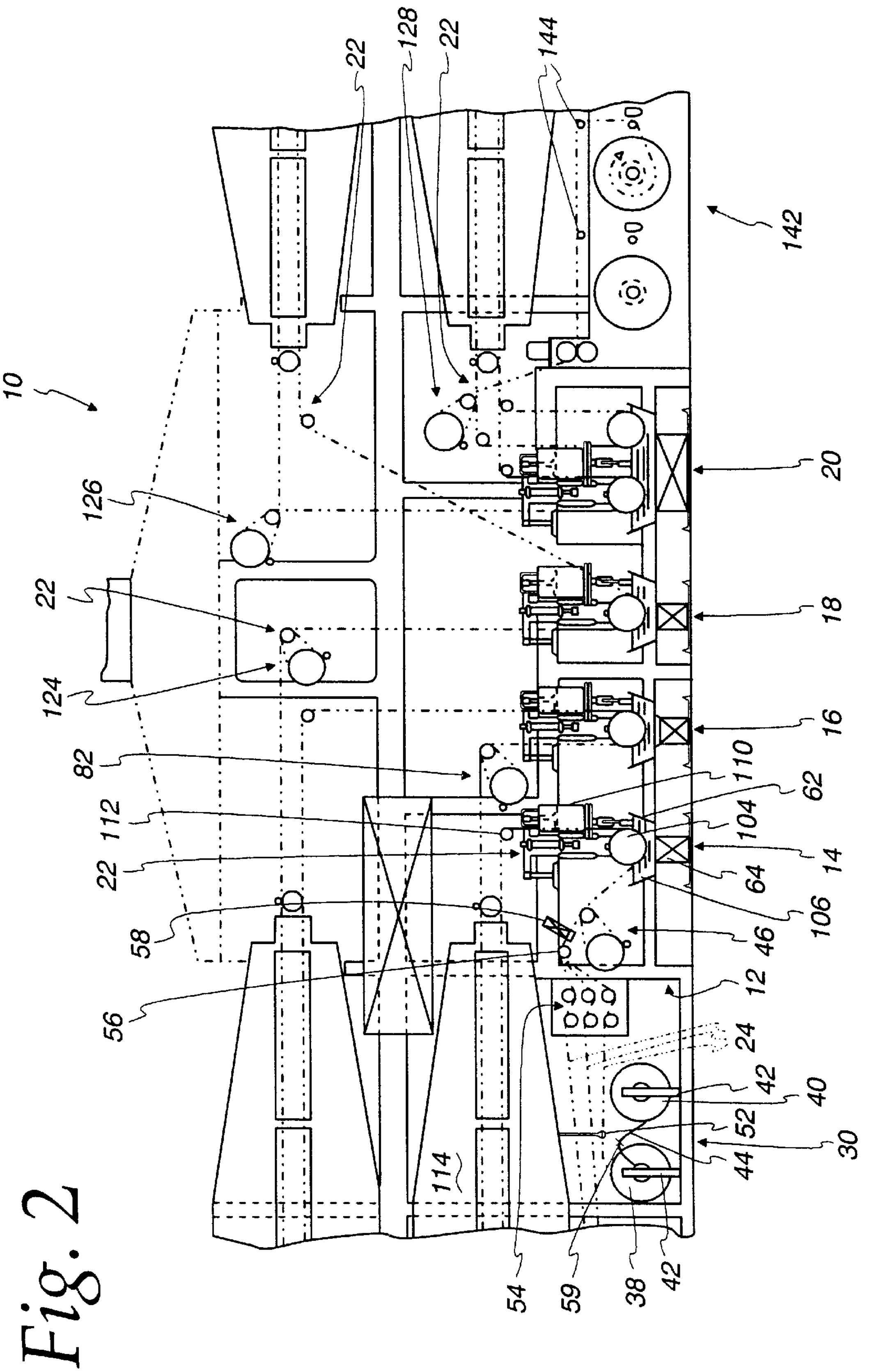
FIG. 2 is an enlarged, fragmentary, front elevation, partial cross-sectional view of a central portion of the apparatus in FIG. 1.

In FIGS. 1 and 2, an apparatus for treating cords for use in power transmission belts, according to the present invention, is shown at 10. The apparatus 10 consists of a frame 12 which supports four dip processing units 14, 16, 18, 20. A guide system 22 guides multiple (in this case three) cords 24, simultaneously from bulk supplies 26, 28, 30 serially through the dip processing units 14, 16, 18, 20 to take-up units 32, 34, 36, at which the processed cords 24 are accumulated. Through the guide system 22, the plurality of cords 24 are simultaneously guided in a like plurality of predetermined paths between the supplies 26, 28, 30 and the take-up units 32, 34, 36.

The bulk supplies 26, 28, 30 are each the same. Exemplary bulk supply 30 consists of separate cheese bobbins 38, 40 supported on a creel stand 42. A leader cord 44 connects to trailing and leading ends on the cords 24 on the cheese bobbins 38, 40.

The cords 24 are simultaneously drawn off of the supplies 26, 28, 30 by a driving roller assembly 46, as seen in FIGS. 1, 2, 4 and 5. Above each supply 26, 28, 30 a support/guide ring 48, 50, 52 is provided, between the supplies 26, 20 28, 30 and the driving roller assembly 46. Between the support/guide rings 48, 50, 52 and the driving roller assembly 46 are provided pairs of friction tensioners 54 which apply a slight tension to the cords 24. The cords 24, after passing the friction tensioners 54, pass over a guide roller 56. Between the guide roller 56 and the driving roller assembly 46 is a detector 58 which identifies the passing of a splice connection 59 on the cords 24. The detector 58 may be any device suitable for detecting the presence of the splice connection 59. For example, an optical detector could be used for this purpose. The cords 24 progress from the driving roller assembly 46 into a dip tank 62 on a support 64 making up the dip processing unit 14.

Figure 4:
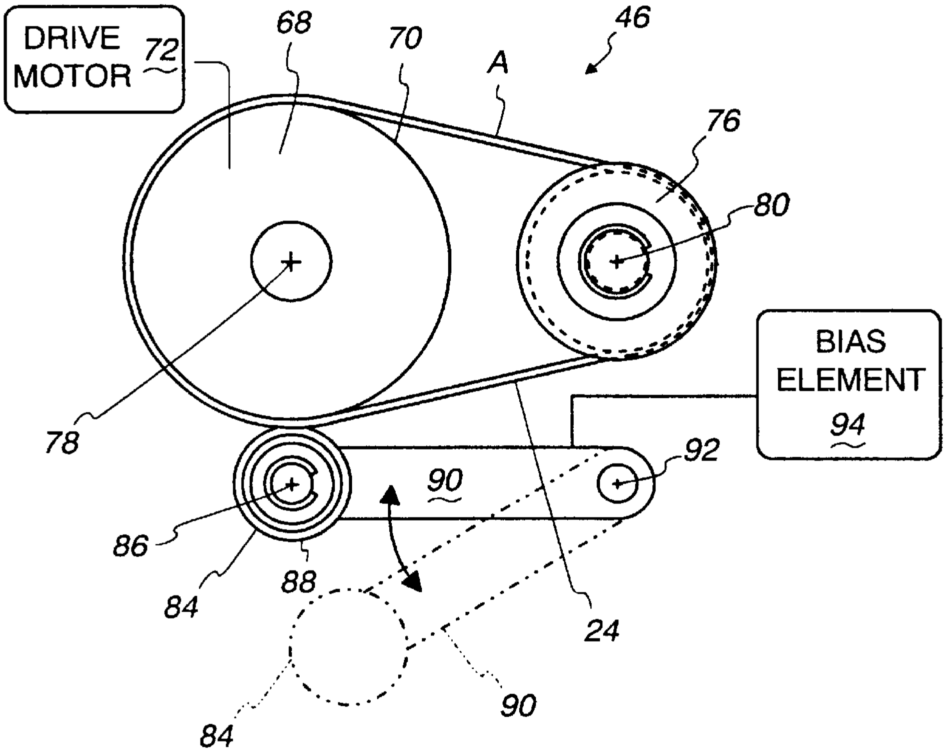
FIG. 4 is an enlarged, fragmentary, front elevation view of a cord driving subassembly on the apparatus in FIGS. 1 and 2.
Figure 5:
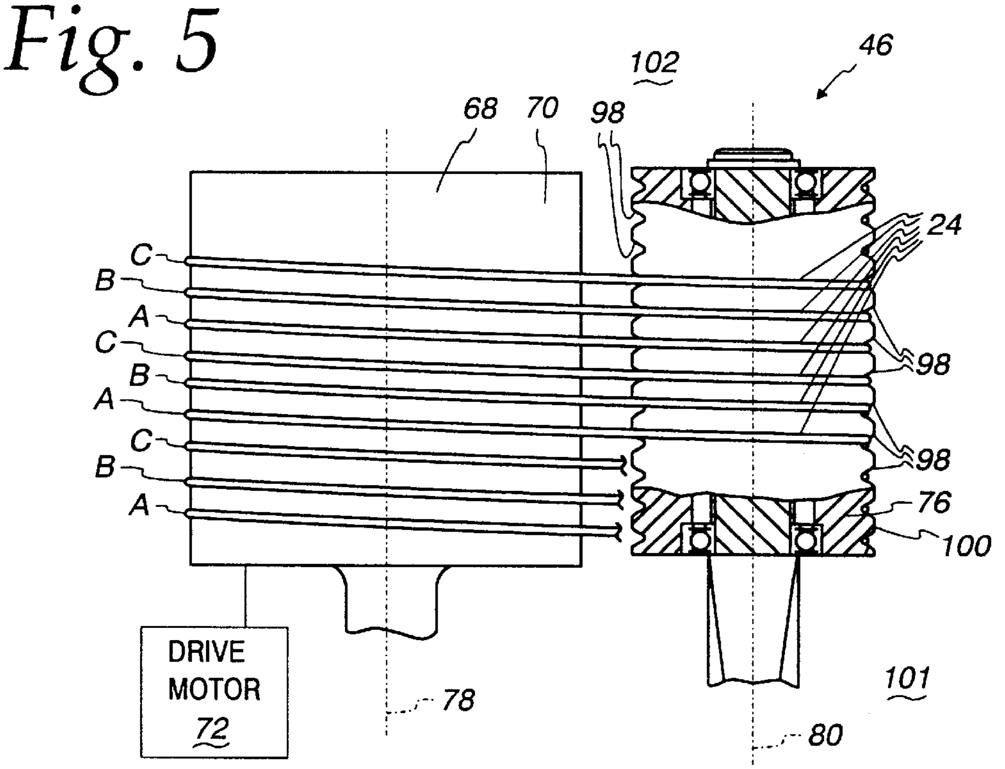
FIG. 5 is a plan view of the cord driving subassembly in FIG. 4.
Figure 6:
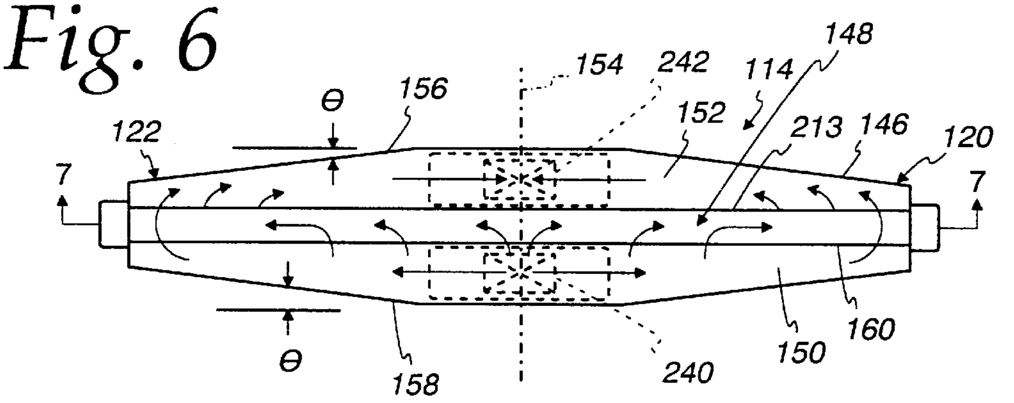
FIG. 6 is an enlarged, front elevation view of a drying oven on the apparatus in FIGS. 1 and 2.
Figure 7:
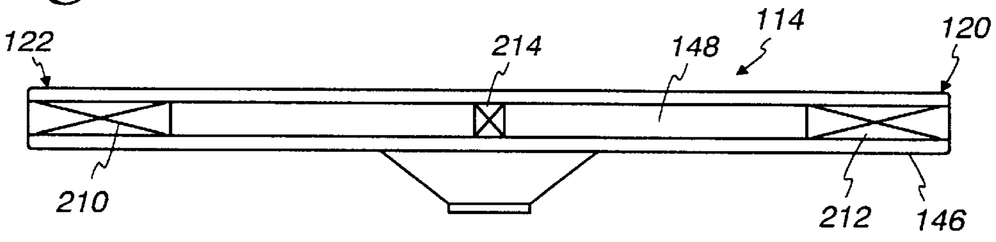
FIG. 7 is a cross-sectional view of the drying oven taken along line 7—7 of FIG. 6.
Figure 8:
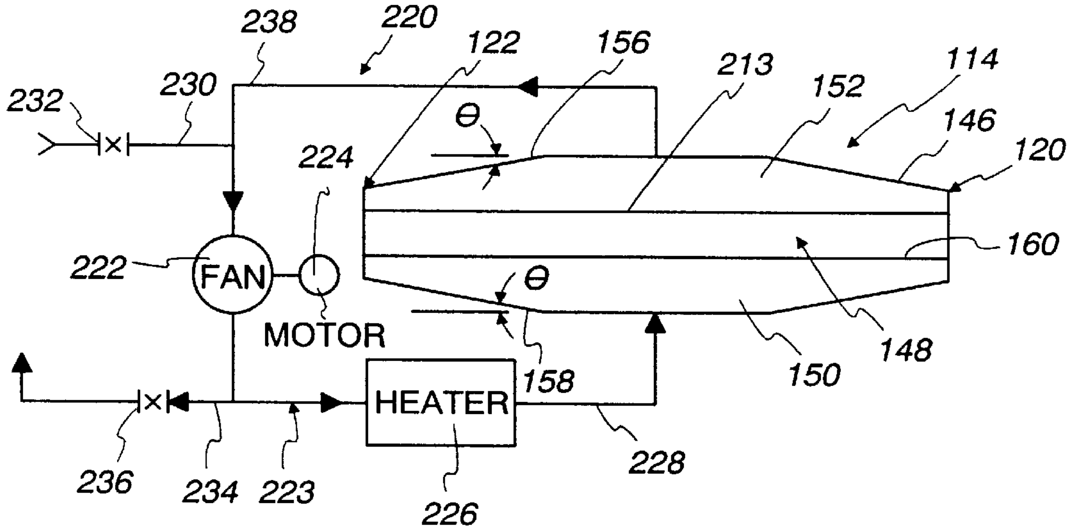
FIG. 8 is a schematic representation of a system for circulating heated air in the drying oven in FIG. 7.
Figure 10:
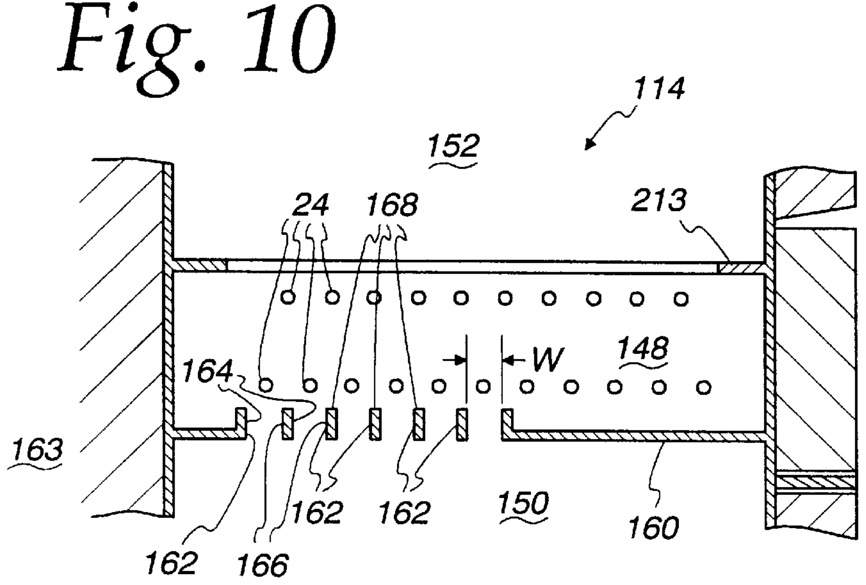
FIG. 10 is an enlarged, cross-sectional view of the drying oven taken along line 10—10 of FIG. 9.
Figure 9:
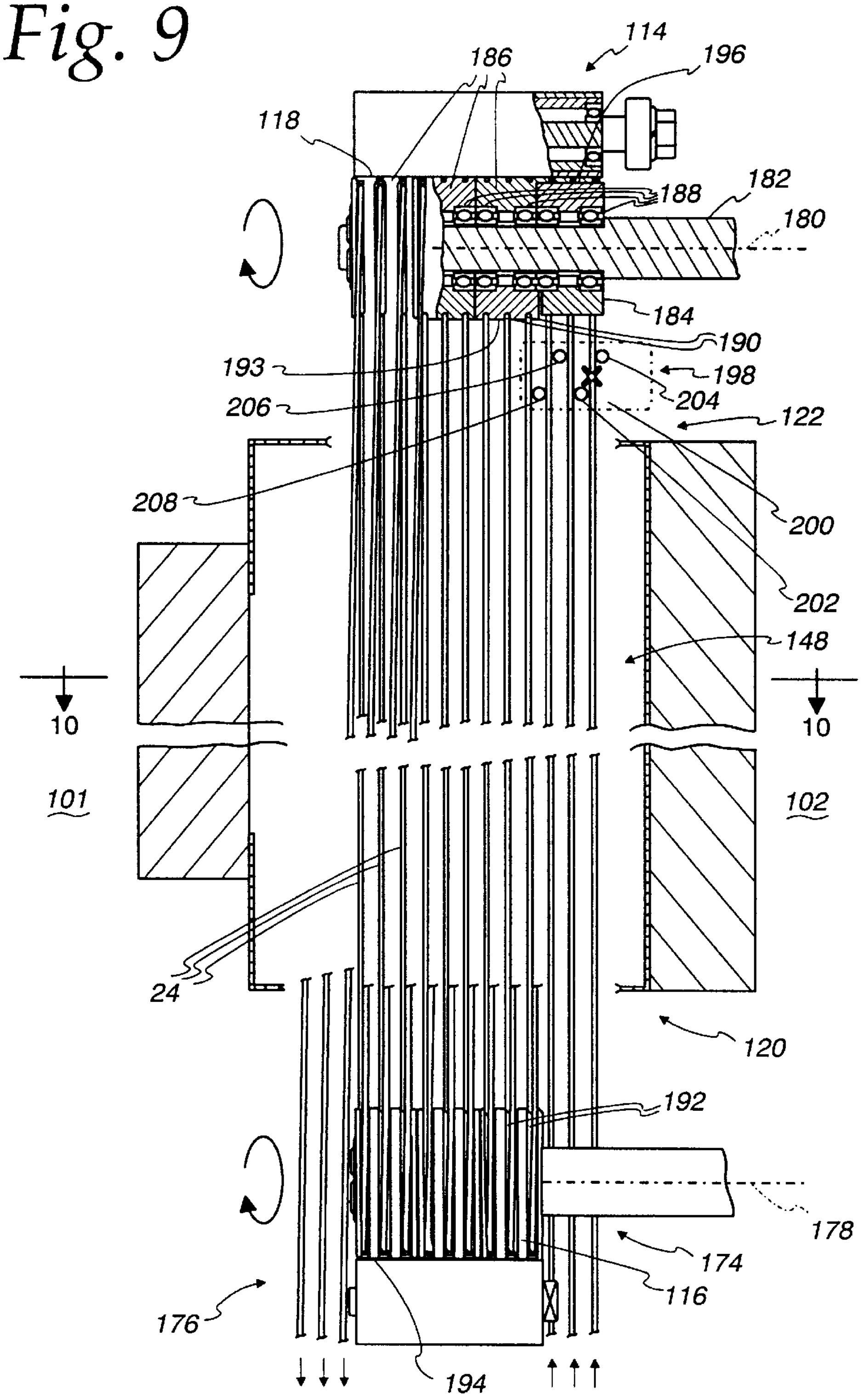
FIG. 9 is an enlarged, fragmentary, partial cross-sectional view of the drying oven in FIGS. 7 and 8 with cords being directed therethrough.

The driving roller assembly 46, as seen most clearly in FIGS. 4 and 5, consists of a driving roller 68 having a smooth, cylindrical, outer surface 70 that is driven by a variable speed drive motor 72. The driving roller assembly 46 further includes a grooved guide roller 76 situated so that the driving roller 68 and guide roller 76 rotate about spaced, parallel axes 78, 80, respectively. The cords 24, identified as A, B, C, in FIG. 5, are each wrapped several times, in this case three times, around the driving rollers 68 and guide roller 76 to produce a positive frictional force between the cords 24 and the rollers 68, 76. This arrangement also avoids slackening of the cords 24 as a result of a tension produced on the cords 24 through a second driving roller assembly 82 (FIG. 2), downstream of the driving roller assembly 46.

A pinch roller 84 is biasably pressed against the outer surface 70 of the driving roller 68 and presses the cords 24 thereagainst. The pinch roller 84 has a length along its axis 86 sufficient to simultaneously engage all cords 24 wrapped around the drive roller 68. The pinch roller 84 has a cylindrical shape with an outer layer 88 made of a soft resin or rubber. The pinch roller 84 is mounted on an arm 90 which pivots about an axis 92 between solid and phantom line positions in FIG. 4. A bias element 94, such as a spring or a cylinder, urges the arm 90 toward the solid line position in FIG. 4. Normally, the roller 84 is retracted to an open position, shown in phantom lines in FIG. 4. By biasing the roller 84 against the outer surface 70, slackening of the cords 24 is prevented. The roller 84 also prevents shifting of the cords 24 axially along the driving roller 68.

The three cords 24 are fitted one each into spiral grooves 98 formed in the outer surface 100 of the guide roller 76. The grooves 98 have a regular and fixed axially spacing. In this case, each cord 24 is wrapped in a spiral pattern around the rollers 68, 76 in every third groove so that the cords travel in parallel, predetermined spiral patterns around the rollers 68, 76. In the event that fewer than three cords 24 are used, the same pattern is used for the one or two cords 24. For example, if there are two cords 24 used, the A and B cords would move in the same grooves 98, with the grooves 98 being previously occupied by the C cord being empty.

The apparatus 10 has a front side 101 and a rear side 102. The operator of the apparatus 10 resides at the front side 101 of the apparatus 10 to thread the cords 24, inspect the cords 24, fill the dip tank 62, etc. The cords 24 are routed so that they move axially relative to the rollers 68, 76 from the rear side 102 to the front side 101 of the apparatus 10 for ease of maintenance and inspection.

Figure 3:
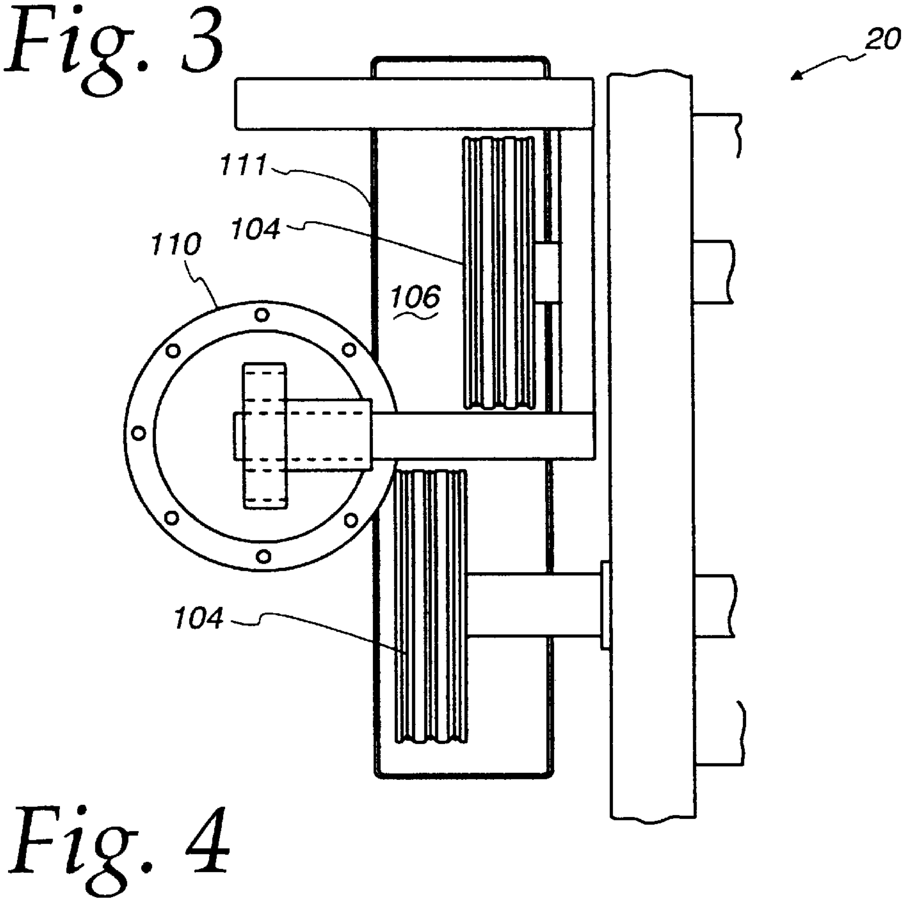
FIG. 3 is an enlarged, fragmentary, plan view of a dip structure for applying a treating substance to a cord on the apparatus in FIGS. 1 and 2.

As seen in FIG. 2, the cords 24 wrap around approximately one-half the circumference of a dip roller 104, which is immersed in a processing liquid 106 in the dip tank 62. The liquid supply in the tank 62 is continuously replenished by liquid in a storage tank 110, which keeps the level of liquid in the tank 62 substantially constant at a predetermined level. In FIG. 3, the dip processing unit 20 is shown with two dip rollers 104 in a wider tank 111 in which processing liquid 106 is retained and supplied from a like storage tank 110. In this unit 20, dip processing takes place two times, whereas dip processing takes place only one time in each of the other units 14, 16, 18.

As seen in FIGS. 1 and 2, from the dip tank 62, the cords 24 move upwardly and wrap around approximately one-quarter of the circumference of a guide roller 112 and then move horizontally into an elongate drying oven 114. As described in greater detail below, the cords 24 are caused to move back and forth several times within the drying oven 114 between rollers 116, 118 at the ends 120, 122 of the drying oven 114. In the oven 114, the cords 24 are heated to dry the liquid 106 applied thereto. The cord 24 are cooled in the atmosphere as they discharge from the drying oven at the oven end 120. The cords 24 exiting the drying oven 114 move to the second driving roller assembly 82, which is likewise operable selectively at different speeds. The speed of the second driving roller assembly 82 is determined by monitoring the speed of the driving roller assembly 46 and matching the speed of the second driving roller assembly 82 to that of the driving roller assembly 46. Third, fourth, and fifth downstream driving roller assemblies 124, 126, 128 also have speed control capabilities incorporated therein. The speed of each driving roller assembly 124, 126, 128 is monitored and matched to the speed of the immediately upstream driving roller assembly 124, 126.

The apparatus 10 can be used to process the cords 24 in a number of different manners. The precise manner selected depends upon the nature of the substance being applied to the cords 24. For example, different forms of processing liquid can be used, i.e. pre-dip liquid, RFL liquid, and soaking liquid. Different drying temperatures and cord tensions can be chosen as well. In this case, three additional dip processing units 16, 18, 20 are provided downstream of the dip processing unit 14. The cords 24 can be dip processed in any one or all of the dip processing units 14, 16, 18, 20 followed by heat treating in the drying oven 114 and/or one or all of the additional three ovens 136, 138, 140 downstream of the oven 114. The invention contemplates that a single dip processing procedure, up to four dip processing procedures, can be carried out followed by heat treating in one to four of the ovens 114, 136, 138, 140, followed by cooling outside of the ovens 114, 136, 138, 140.

After dip processing and heating, the cords 24, as seen in FIGS. 1 and 2, are directed to the take-up units 32, 34, 36. In the take-up section 142 of the apparatus 10, the cords 24 pass over six guide rollers 144 and from there are directed for accumulation on the take-up units 32, 34, 36.

Each oven 114, 136, 138, 140 is substantially the same in construction and uses a forced air, indirect heating. Exemplary oven 114 will now be described with respect to FIGS. 1 and 6–10. The oven 114 has a housing 146 defining an internal air flow space. The housing 146 has an internal heating/drying chamber 148 through which the cords 24 pass during treatment. Beneath the heating/drying chamber 148 is a hot air supply chamber 150 which communicates with the heating/dying chamber 148. A hot air recovery chamber 152 is located above, and communicates with, the heating/drying chamber 148. Incoming heated air is communicated from the hot air supply chamber 150 to the heating/drying chamber 148 to the hot air recovery chamber 152.

The housing 146 and chambers 148, 150, 152 are substantially symmetrical about a vertical plane 154. The heating/drying chamber 148 has a substantially uniform cross section. Each of the chambers 150, 152 has a substantially uniform cross section in the vicinity of the center plane 154 and tapers progressively toward each of the ends 120, 122 of the oven 114. The angle θ of inclination of the top wall 156 and bottom wall 158 is between 5°–30°. This arrangement causes a uniform flow speed of hot air travelling through the hot air supply chamber 150 and hot air recovery chamber 152 so as to prevent combustible gas, such as toluene, from stagnating at locations in the hot air supply chamber 150 and hot air recovery chamber 152.

The sloping arrangement of the top and bottom walls 156, 158 also provides useable space, such as to facilitate compact nesting of system components, such as the bulk cord supplies 26, 28, 30, the take-up units 32, 34, 36, control panels, and other components. This makes possible the designing of a compact, overall system.

A partition 160 separates the hot air supply chamber 150 from the heating/drying chamber 148. The partition 160 has a plurality of slit-shaped openings/slits 162 therethrough which extend in parallel relationship for substantially the entire length of the oven 114 between the ends 120, 122 thereof. The slit-shaped openings 162 are provided on the rear side 163 of the oven 114 at which the cords 24 enter. In the embodiment shown, the openings 162 are provided over approximately one-half the front to rear dimension of the oven 114. Through this arrangement, the heated air can be concentrated on the incoming cords 124 which have undried processing liquid 106 thereon. The slit-shaped openings 162 are defined between vertically extending flat surfaces 164, 166 on adjacent, spaced partitions 168. The cords 24 are centered in a front to rear direction between the surfaces 164, 166 so that the heated air is funnelled thereby to directly against the cords 24. The hot air blown through the openings 162 is normally moving at a speed of 5–30 meters per second. Preferably, the width of the slit-shaped openings (W) is 3–10 mm, with the spacing of the openings being 5–30 mm.

The guide rollers 116, 118 are disposed outside of the drying oven 114 adjacent to the ends 120, 122 thereof. The incoming cords 24 move in a first straight line path portion at 174. The cords 24 depart the drying oven 114 in a path portion at 176 that is substantially straight and parallel to the path portion at 174. Between the rollers 116, 118, the cords 24 move in substantially straight paths generally parallel to the length of the oven 114 between the ends 120, 122 thereof. More particularly, the cords 24 pass under the rollers 116, 118 as they enter the oven 114 to be in close proximity to the heated air from the hot air supply chamber 150. The cords 24 wrap approximately 180° around the roller 118 and extend over and then under the roller 116, wrapping through approximately 180°. The cords 24 continue this wrapping motion, wrapping over and under the roller 116 three times and under and over the roller 118 four times between the time that they enter and depart from the heating/drying chamber 148. The system is configured so that the cords 24 shift from rear to front an amount equal to the total number of cords ×1 pitch dimension for each passage between the rollers 116, 118. In each wrapping motion, the cords 24 contact the rollers 118, 116 through approximately 180°. The cords 24 moving in their respective paths move progressively from the rear 102 to the front 100 of the oven 114 as the rollers 116, 118 are rotated around their respective axes 178, 180. In this manner, each of the cords 24 moves spirally in a predetermined pattern, with the cords 24 remaining substantially parallel to each other through the heating/drying chamber 148. With this arrangement, each cord 24 is caused to pass back and forth within the heating/drying chamber 148 several times, including multiple passes directly over the slit-shaped openings 162. Preferably the part of the predetermined cord path through which a cord initially enters the heating/drying chamber 148 is directly over the rearmost slit-shaped opening 162 to effect sufficient drying of the treating substance 106 so that it will not be released to any part of the apparatus 10 contacted by the cord 24 moving in the predetermined path after the treatment substance 106 is applied.

Because the slit-shaped openings 162 are arranged to align with the straight line path portion 174, the slit-shaped openings do not have to be angled to match the spiral path portions for the cords 24. Formation of the slit-shaped openings 162 is thus facilitated.

The roller 118 consists of a shaft 182 upon which one roller element 184, having one configuration, and three roller elements 186 having a different configuration than the one roller 184, are coaxially mounted for rotation on bearings 188 interposed between the roller elements 184, 186 and the shaft 182. The roller elements 184, 186 have an axial dimension chosen so that they will each simultaneously accommodate the number (in this case three) of cords 24 simultaneously advanced through the apparatus 10. That is, each of the three cords 24 reside at all times on each of the roller elements 184, 186 so that the cord tension is uniform within the heating/drying chamber 148. Grooves 190, 192 are defined in the annular outer surfaces 193, 194 of the roller elements 186 and roller 116 at a predetermined spacing, with their being one cord 24 fitted in each groove 190, 192 as the system is operated. This maintains the desired parallel alignment of the cords 24 as they travel through the heating/drying chamber 48 in their predetermined paths. The roller element 184 has an annular outer surface 196 that is flat i.e. without grooves.

Immediately upstream of the roller element 184 is a cord separator 198. The cord separator 198 consists of a mounting plate 200 from which strategically located pins 202, 204, 206, 208 project upwardly in a zig-zag pattern. The pins 202–208 are spaced 20–30 mm in the lengthwise direction of the drying oven 114. With this arrangement, the pin pairs 202, 204; 202, 206; 206, 208 cooperate to align and guide the moving cords 24. With this arrangement, the splice connection 59 on the cords 24 will move without hangup through the cord separator 198.

The smooth surface 196 of the roller element 184 resists buildup of the processing liquid 106 with which the cords 24 are treated. Any of the liquid that does transfer to the surface 196 tends to disperse, rather than accumulate, thereby extending the running period for the apparatus 10 before regular maintenance of the guide roller 118 is required. Additionally, maintenance is facilitated by reason of the fact that the roller element 184 can be slid along the shaft 182 relative to the cords 24 without having to remove the cords 24.

Heated air from the heating/drying chamber 148 is communicated to the hot air recovery chamber 152 through openings 210, 212 at the ends 120, 122 of the drying oven 114 extending through a partition 213 separating the heating/drying chamber 148 from the hot air recovery chamber 152. The combined area of the openings 210, 212 is selected to be substantially equal to the combined area of the slit openings 162 through the partition 160 to cause even air flow. To adjust the temperature distribution in the heating/drying chamber 148, it is possible to use an auxiliary opening 214 between the openings 210, 212.

A hot air circulating system for the drying oven 114 is shown at 220. The system 220 includes an air moving element/fan 222 in a duct system 223, which fan is operated by an electric motor 224. Air is forced by the fan 222 through a heater 226. Air heated by the heater 226 is directed through a conduit 228 into the hot air supply chamber 150. Outside air can be controllably delivered to the fan 222 through a conduit 230 which has an in-line damper 232. Air delivered by the fan 222 can be partially exhausted to the atmosphere through a conduit 234 controlled by an in-line damper 236. Air passing through the heating/drying chamber 148 to the hot air recovery chamber 152 is returned to the fan 222 via a conduit 238 to complete the circulation loop. The dampers 232, 236 can be manually operated or can be automatically operated in response to a pressure differential between the atmosphere and the system loop. Additional ventilation can be provided in conventional fashion between the interior of the housing 146 and the atmosphere.

In operation, heated air from the conduit 228 is delivered from the conduit 228 through an inlet opening 240 in the housing 146. The heated air branches from the opening 240 towards both ends 120, 122 of the drying oven 114. The tapering configuration of the chamber 150 avoids pressure reduction at the ends 120, 122 so that with a uniform incoming air speed, the heated air is propelled forcibly through the slit openings 162. By having the hot air flow into the heating/drying chamber 148 from the ends 120, 122, the air moves smoothly and a uniform heating of the chamber 148 takes place throughout the heating/drying chamber 148, even in the regions which are not located directly above slit-shaped openings 162. Uniform heating results in uniformity in the properties of the cords 24 after treatment.

The hot air blowing through the slit openings 162 moves vertically and is concentrated on the wet cords 24 and then branches laterally towards the ends 120, 122 from where it is discharged through the openings 210, 212 into the hot air recovery chamber 152. This accounts for an efficient, uniform heating of the cords 24 in the heating/drying chamber 148 while at the same time preventing combustible gases such as toluene from stagnating anywhere within the housing 146.

From the hot air recovery chamber 152, the air discharges from the housing 146 through an opening 242, which communicates with the conduit 238 for delivery back to the fan 222. The dampers 232, 234 are adjusted to control communication of air from the system to the atmosphere and from the atmosphere to the system. The concentration of combustible gas resulting from the vaporization of toluene or the like, used as a solvent in the processing liquid, is thus reduced, as a result of which system safety is enhanced.

The drying oven 114 has access doors 244 in the front side thereof. Temperature control devices, gas concentration detectors, and gas suction and discharge ducts (none of which are shown) can also be provided.

Figure 11:
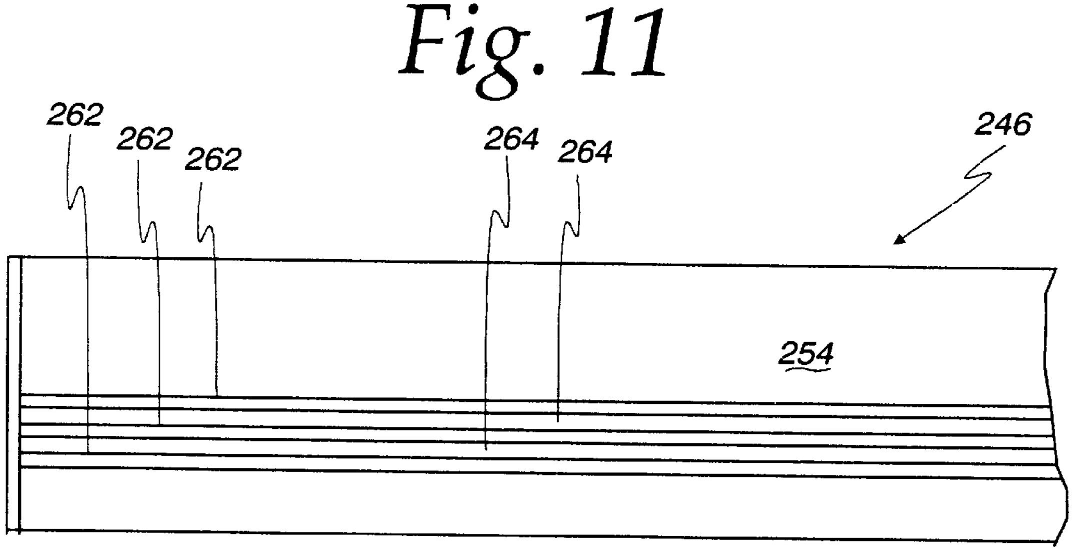
FIG. 11 is a view as in FIG. 10 of a modified form of drying oven.
Figure 12:
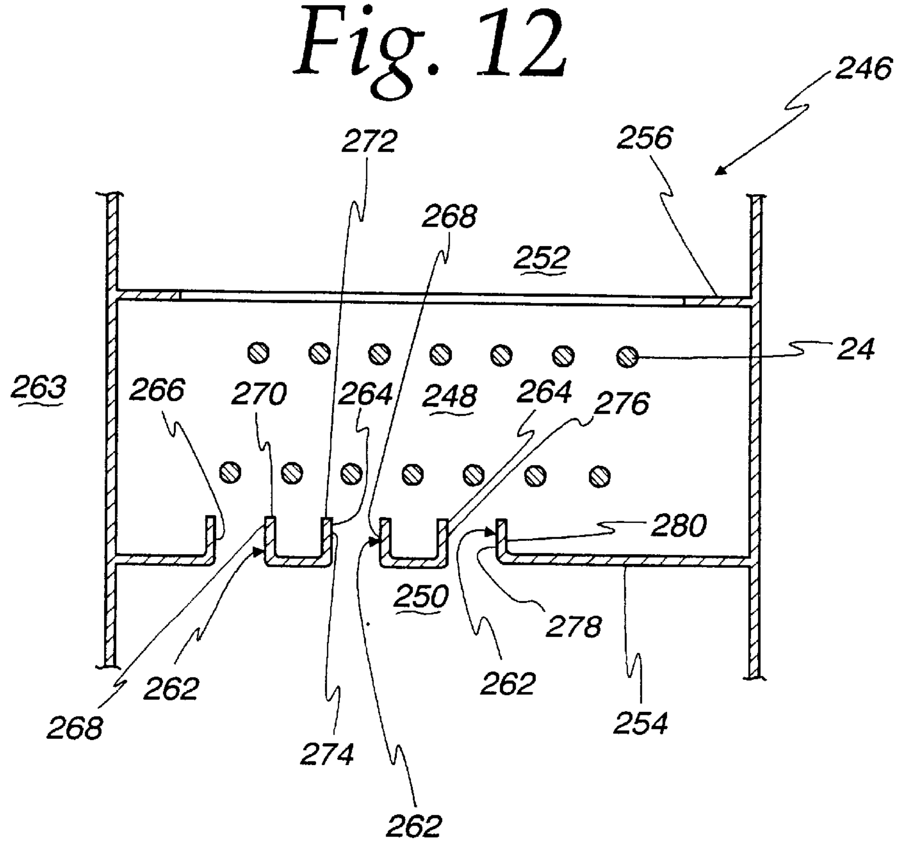
FIG. 12 is a fragmentary, bottom view of a partition on the drying oven of FIG. 11.

A modified form of drying oven is shown at 246 in FIGS. 11 and 12. The oven 246 has a heating/drying chamber 248, a hot air supply chamber 250, and a hot air recovery chamber 252, corresponding to the heating/drying chamber 148, hot air supply chamber 150, and hot air recovery chamber 152 on the drying oven 114, previously described. The heating/drying chamber 248 and hot air supply chamber 250 are separated by a first partition 254 with the heating/drying chamber 248 and hot air recovery chamber 252 being separated by a second partition 256.

The only significant structural difference between the drying oven 246 and the drying oven 114 is in the configuration of the partition 254. In the drying oven 246, slit-shaped openings/slits 262 on the rear side 263 of the drying oven 246 are defined by dividers 264 each having an upwardly opening U-shaped cross-sectional configuration. The rearmost slit 262 is defmed between a forwardly facing surface 266 on an upturned edge of the partition 254 and a rearwardly facing surface 268 on one leg 270 of the rearmost divider 264. The other leg 272 of the rearmost divider 264 has a forwardly facing surface 274 which defines the next, forwardly spaced slit 262 in conjunction with the rearwardly facing surface 268 on the adjacent divider 264 situated forwardly thereof. The forwardmost slit 262 is defmed between the forwardly facing surface 274 on the forwardmost divider 264 and a rearwardly facing surface 278 on an upturned edge 280 of the partition 254.

The fore and aft dimension of a web 276 on each divider 264 determines the spacing between adjacent slits 262, which is preferably the same as the previously-described spacing for the slits 162, as is the slit width.

The foregoing disclosure of specific embodiments is intended to be illustrative of the broad concepts comprehended by the invention.

We claim:

1. An oven for continuously heating a cord, said oven comprising:

a housing defining an internal space for treatment of a cord, said housing having an inlet and an outlet communicating with the internal housing space and between which a cord being heated passes in a predetermined path, there being a heating chamber within the internal housing space through which a cord being heated travels between the housing inlet and housing outlet, a first partition within the internal housing space beneath at least a part of the predetermined path and defining an upper wall of a hot air supply chamber within the internal housing space, said first partition having an elongate slit therethrough that resides beneath and extends parallel to the part of the predetermined path through which slit air in the hot air supply chamber is communicated to the heating chamber, an inlet opening in the housing for communicating heated air to the hot air supply chamber, said housing having a second partition with first and second openings spaced in a lengthwise direction relative to the slit for causing heated air in the heating chamber to branch into each of the first and second openings, an air moving element;

a conduit system for directing air from the first and second openings to the air moving element and for directing air accelerated by the air moving element to the hot air supply chamber; and a heater for air directed into the heating chamber.

2. The oven for heating a cord according to claim 1 wherein the housing has spaced ends, heated air is introduced to the hot air supply chamber at a first location, the hot air supply chamber has a cross-sectional area and the cross-sectional area of the hot air supply chamber diminishes between the first location and each of the spaced housing ends.

3. The oven for heating a cord according to claim 1 wherein the housing has spaced ends, the second partition is spaced above the heating chamber and bounds a hot air recovery chamber, the hot air recovery chamber has a cross-sectional area, there is an air discharge opening in the housing communicating with the hot air recovery chamber at a first location and the cross-sectional area of the hot air recovery chamber diminishes between the first location and each of the spaced housing ends.

4. The oven for heating a cord according to claim 2 wherein the housing ends are spaced in a lengthwise direction with respect to the elongate slit in the first partition.

5. The oven for heating a cord according to claim 1 wherein the first partition has a first thickness in a vertical direction and there are first and second plates with first and second surfaces that bound the elongate slit and extend in a vertical direction a distance greater than the thickness of the first partition.

6. The oven for heating a cord according to claim 1 wherein there are a plurality of discrete, elongate slits through the first partition through which air is communicated from the hot air supply chamber to the heating chamber.

7. The oven for heating a cord according to claim 1 wherein there is an auxiliary air flow opening in the second partition between the first and second openings.

8. The oven for heating a cord according to claim 1 wherein the air moving element comprises a fan and the fan causes air to be directed through the elongate slit at 5–30 m/sec.

9. The oven for heating a cord according to claim 1 in combination with a guide structure and a cord for use in a power transmission belt moving through the guide structure in the predetermined path through the heating chamber.

10. The oven for heating a cord according to claim 9 in combination with a treatment unit for applying a processing liquid to the cord moving in the predetermined path before the cord moves through the heating chamber.

11. The oven for heating a cord according to claim 1 wherein the cord moves in the part of the predetermined path substantially parallel to and directly over the elongate slit.

12. The oven for heating a cord according to claim 6 wherein the slits each have a width of 3–10 mm and are spaced from each other 5–30 mm.

13. The oven for heating a cord according to claim 1 including a first conduit for drawing atmospheric air to the air moving element.

14. The oven for heating a cord according to claim 13 including a second conduit for exhausting air from the air moving element to the atmosphere.

15. The oven for heating a cord according to claim 14 including a damper for controlling the exhaustion of air to the atmosphere through the second conduit.

16. An oven for continuously heating a cord, said oven comprising:

a housing defining a hot air supply chamber, a heating chamber, an air intake opening communicating with the hot air supply chamber, and an air discharge opening communicating with the heating chamber, there being a partition between the hot air supply chamber and heating chamber;

a guide system for directing a cord in a predetermined path through the heating chamber, there being a slit through the partition with the slit located directly beneath a part of the predetermined path for communicating heated air from the hot air supply chamber to the heating chamber to against a cord moving in the predetermined path;

a hot air circulating system for directing air from the discharge opening back into the hot air supply chamber through the air intake opening; and a heater for heating air moving in the hot air circulating system before the air moves through the slit to against a cord moving in the predetermined path.

17. The oven according to claim 16 wherein the part of the predetermined path and the elongate slit are both substantially straight.

18. The oven according to claim 16 in combination with a treatment unit for applying a processing liquid to a cord moving in the predetermined path.

19. The oven according to claim 18 in combination with a cord for use in a power transmission belt wherein the cord moving in the predetermined path has processing liquid applied thereto by the treatment unit before entering the heating chamber.

20. The oven according to claim 19 wherein the housing has ends spaced lengthwise with respect to the elongate slit the air in the heating chamber flows through first and second openings spaced lengthwise of the slit to and through the discharge opening.

21. The oven according to claim 20 wherein the heating space has a cross-sectional area and the cross-sectional area of the heating space diminishes between the air intake opening and each of the ends of the housing.

22. The oven according to claim 16 wherein the housing has ends spaced lengthwise with respect to the elongate slit and the slit extends over substantially the entire extent of the partition between the ends of the housing.

23. The oven according to claim 16 wherein the predetermined path includes multiple path parts in which a cord passes back and forth through the heating chamber including a first path part through which a cord first passes in entering the heating chamber and the slit is directly beneath the first path part.

* * * * *